(12) United States Patent
Srinivasan et al.

(10) Patent No.: US 9,043,886 B2
(45) Date of Patent: May 26, 2015

(54) RELYING PARTY PLATFORM/FRAMEWORK FOR ACCESS MANAGEMENT INFRASTRUCTURES

(75) Inventors: Venkataraman Uppili Srinivasan, Fremont, CA (US); Rajeev Angal, San Jose, CA (US); Ajay Sondhi, San Jose, CA (US); Shivaram Bhat, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 187 days.

(21) Appl. No.: 13/464,880

(22) Filed: May 4, 2012

(65) Prior Publication Data

US 2013/0086657 A1 Apr. 4, 2013

Related U.S. Application Data

(60) Provisional application No. 61/541,026, filed on Sep. 29, 2011.

(51) Int. Cl.
*H04L 29/06* (2006.01)
*H04L 9/32* (2006.01)

(52) U.S. Cl.
CPC .............. *H04L 63/10* (2013.01); *H04L 9/3234* (2013.01); *H04L 63/0815* (2013.01)

(58) Field of Classification Search
CPC ................ G06F 2221/2115; G06F 2221/2117; G06F 21/41; H04L 9/3234
USPC ........................................................ 726/5–9
See application file for complete search history.

(56) References Cited

U.S. PATENT DOCUMENTS

| 7,685,206 B1 | 3/2010 | Mathew et al. |
| 7,784,092 B2 * | 8/2010 | Pearson et al. .................... 726/8 |
| 7,788,494 B2 * | 8/2010 | Aissi et al. ..................... 713/171 |
| 7,836,484 B2 * | 11/2010 | Pardo-Blazquez et al. ....... 726/1 |
| 2006/0218625 A1* | 9/2006 | Pearson et al. ..................... 726/4 |
| 2009/0296936 A1* | 12/2009 | Lie et al. ....................... 380/277 |
| 2009/0300355 A1* | 12/2009 | Crane et al. ................... 713/168 |
| 2010/0011421 A1* | 1/2010 | Chari et al. ....................... 726/5 |
| 2010/0043065 A1* | 2/2010 | Bray et al. ........................ 726/8 |
| 2010/0100952 A1 | 4/2010 | Sample et al. |

(Continued)

OTHER PUBLICATIONS

PCT Patent Application No. PCT/US2012/57754, International Search Report mailed on May 14, 2014, 9 pages.

(Continued)

*Primary Examiner* — Hadi Armouche
*Assistant Examiner* — Hee Song
(74) *Attorney, Agent, or Firm* — Kilpatrick Townsend & Stockton LLP

(57) ABSTRACT

A framework is provided for integrating Internet identities in enterprise identity and access management (IAM) infrastructures. A framework is provided for open authorization. A framework is also provided for relying party functionality. A mapping repository can be configured to store a mapping between applications and identity providers. The mapping associates each application of a plurality of applications with one or more identity providers. Identity management logic can be configured to use the mapping to determine that one or more identity providers of a first plurality of identity providers can be used to perform authentication activities on behalf of the first application in response to receiving a first request associated with a first application.

17 Claims, 9 Drawing Sheets

(56) References Cited

U.S. PATENT DOCUMENTS

| | | | |
|---|---|---|---|
| 2010/0212004 A1 | 8/2010 | Fu et al. | |
| 2011/0296504 A1* | 12/2011 | Burch et al. | 726/6 |
| 2011/0314532 A1* | 12/2011 | Austin et al. | 726/8 |
| 2011/0314533 A1* | 12/2011 | Austin et al. | 726/9 |
| 2012/0005733 A1* | 1/2012 | Ross | 726/6 |
| 2012/0066757 A1* | 3/2012 | Vysogorets et al. | 726/9 |
| 2012/0117626 A1 | 5/2012 | Yates et al. | |
| 2012/0144034 A1* | 6/2012 | McCarty | 709/225 |
| 2012/0151564 A1* | 6/2012 | Robert et al. | 726/7 |
| 2012/0227098 A1* | 9/2012 | Obasanjo et al. | 726/8 |
| 2012/0254959 A1* | 10/2012 | Schmidt et al. | 726/6 |
| 2012/0278876 A1* | 11/2012 | McDonald | 726/9 |
| 2012/0311663 A1* | 12/2012 | Seidl et al. | 726/1 |
| 2013/0007846 A1 | 1/2013 | Murakami et al. | |
| 2013/0024919 A1* | 1/2013 | Wetter et al. | 726/6 |
| 2013/0086645 A1 | 4/2013 | Srinivasan et al. | |
| 2013/0103802 A1* | 4/2013 | Kawato | 709/217 |
| 2013/0227663 A1* | 8/2013 | Cadenas Gonzalez | 726/6 |

OTHER PUBLICATIONS

Lodderstedt et al. "OAuth 2.0 Security Considerations," Internet-Draft, Internet Engineering Task Force (Apr. 2011).

Final Office Action for U.S. Appl. No. 13/631,538 (May 15, 2014) 16 pages.

Non-Final Office Action for U.S. Appl. No. 13/631,538 (Jan. 2, 2014) 18 pages.

Notice of Allowance for U.S. Appl. No. 13/631,538 (Sep. 2, 2014) 9 pages.

Hardt, et al., "OAuth Web Resource Authorization Profiles draft-hardt-oauth-01", Jan. 2010, XP055075817, [retrieved on Aug. 20, 2013]. Retrieved from the Internet: <URL:https://tools.ietf.org/html/draft-hardt-oauth-01>, 40 pages.

Hammer-Lahav, E., "The OAuth 1.0 Protocol", RFC 5849, Apr. 2010, [retrieved on Mar. 12, 2015]. Retrieved from the Internet: <URL: https://tools.ietf.org/html/rfc5849>, 38 pages.

International Search Report and Written Opinion mailed Jan. 22, 2015 in Int'l Patent Application No. PCT/US2014/056466, 11 pages.

\* cited by examiner

FIG. 7

LOG IN

Sign in using your NPR account n|p|r
E-mail address
Password
☐ Remember me
Forgot Password?
Log In Haven't registered yet? Register now.

Or

Sign in using your account with facebook    twitter
Google      YAHOO!
OpenID      Linked in

700

RELYING PARTY PLATFORM/FRAMEWORK FOR ACCESS MANAGEMENT INFRASTRUCTURES

CROSS-REFERENCES TO RELATED APPLICATIONS

The present application is a non-provisional of and claims the benefit and priority under 35 U.S.C. 119(e) of U.S. Provisional Application No. 61/541,026, filed Sep. 29, 2011, entitled RELYING PARTY AND OAUTH FRAMEWORK, the entire contents of which are incorporated herein by reference for all purposes.

FIELD OF THE INVENTION

Embodiments of the present invention relate to identity management, authentication, and authorization frameworks.

BACKGROUND

Many modern businesses have internet-facing properties, such as web sites and applications, e-commerce applications, mobile applications, and other network based systems. Most of these businesses are interested in expanding the user base associated with these internet-facing properties because greater adoption rates often translate into greater revenue.

It is common for these properties, such as web applications to require user-identifying information. For example, an application may require the name, address, and date of birth for a user. This user-identifying information is usually gathered by the application, which stores the information in a database or other storage system for later retrieval. By keeping user-identifying information within the system, the application may allow users to authenticate with the system using only minimal information, such as a username and password, after which the user may have full access to the system without re-entering the user-identifying information.

Although the storage of information by each application has become more convenient for the user than it would be if the user were required to re-enter identifying information every time the user used the application, such applications and internet-facing properties have become ubiquitous. Furthermore, new applications and internet-facing properties are released with such frequency that users have become accustomed to "trying out" new applications only to discard them later. Often, users will abandon an application if they are presented with a requirement to fill out another form with user-identifying information, because users are growing tired of providing the same information to many different web applications. At the same time, users are becoming more aware and cautious about which businesses they will provide user-identifying information to, and just how much information they will provide.

There are some public websites that are so popular that, when taken as a group, they have user-identifying information for a large percentage of Internet users. This information is stored in the form of user accounts that represent "Internet Identities" for the users described by the accounts. These accounts are in public sites like Facebook, Google, and Yahoo!, and represent a treasure trove of tens of millions of users—users that enterprises would like to attract to expand their user bases. However, enterprises have existing investments in identity and access management systems that are not equipped to handle these identities. In other words, these systems are unable to integrate with these varied technologies, and have difficulty managing the scale and security aspects of internet facing deployments that use these technologies.

Some prior attempts at leveraging Internet identities have been made, but most of these solutions are custom built "band aids" that are hard-coded to the products meant to benefit from the integration. These products provide some integration solutions but the solutions are too tied to the product, and cannot be re-used or leveraged for use with other products. Overall, prior solutions lack the extensibility, scalability and security to tackle the both the problems of coping with the changing internet environment as well as preserving investments in existing identity and access management solutions.

BRIEF DESCRIPTION OF THE DRAWINGS

Several drawings are included in this document.

FIG. 7 represents an example user interface that includes a login screen for credential collection.

DETAILED DESCRIPTION OF THE INVENTION

Figure 1:
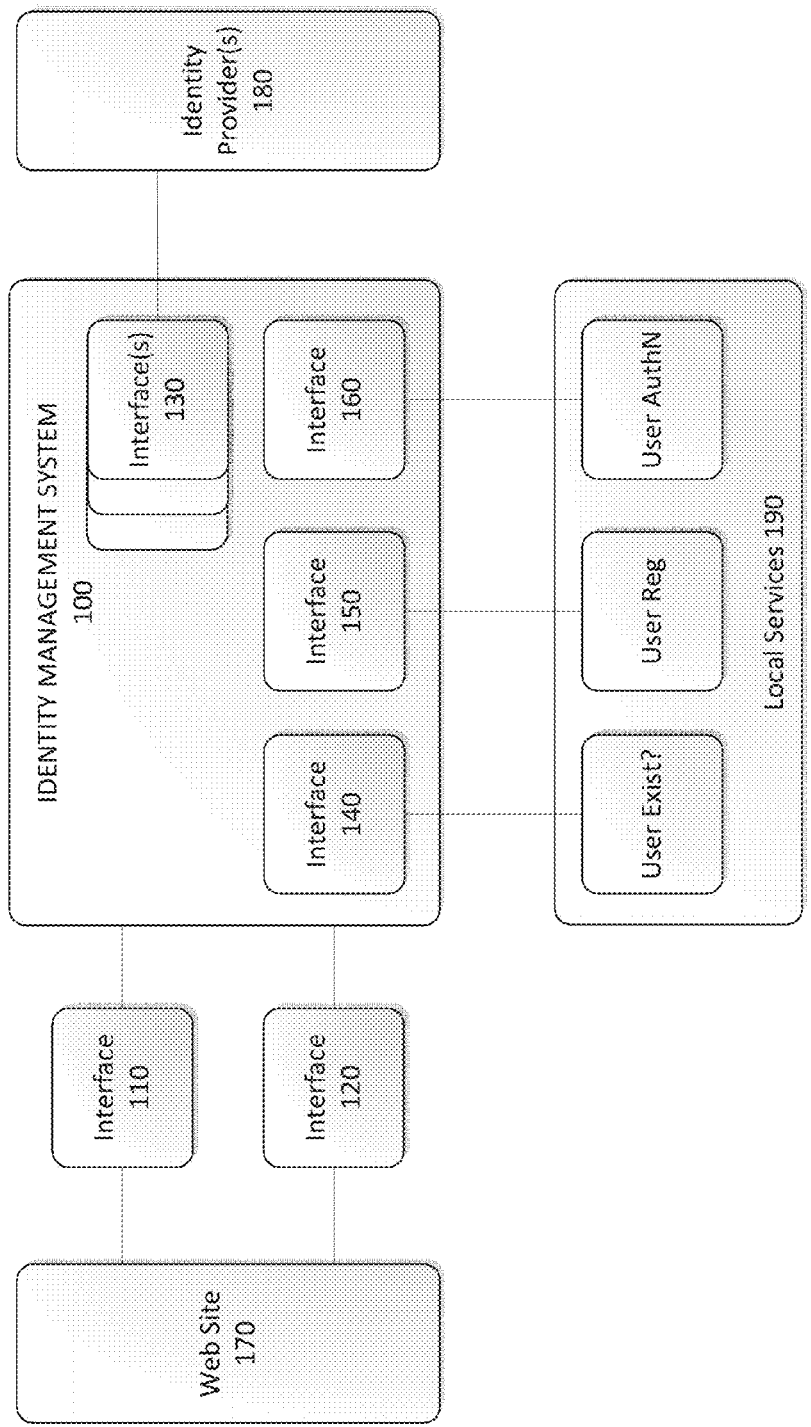
FIG. 1 is a simplified block diagram illustrating an embodiment of an identity management system 100.

In the following description, for the purposes of explanation, specific details are set forth in order to provide a thorough understanding of embodiments of the invention. However, it will be apparent that the invention may be practiced without these specific details.

General Overview

According to an embodiment, a framework or platform is provided with built-in connectors for well-known internet identity providers (IDPs) such as Google, Yahoo, Face Book, LinkedIn, Twitter, custom identity providers, and others. The framework also includes standards-based interfaces to integrate with compliant IDPs (OpenID, OAuth (open authorization), Security Access Markup Language (SAML), and others) in an embodiment. In an embodiment, the framework integrates with leading identity and access management (IAM) vendors such as Oracle, CA, and IBM while offering extensibility via plug-in points layered on top of a workflow or process flow to customize to meet specific deployment needs According to an embodiment, user authentication may be performed using internet identity providers, leading to enterprise session creation at the appropriate level. Furthermore, progressive user registration may be achieved using an embodiment. For example, a user that is authenticated using an identity provider may be offered the opportunity to create an account with the local authorization and identity management system in order to gain access to additional resources that require a greater level of authentication.

Embodiments provide several novel features including but not limited to features related to the framework, workflow/process based plug-ins, progressive and on Demand/Application driven User on boarding and authentication, and the like. An embodiment of the present invention provides significant improvements over prior solutions. The workflow/process model allows businesses to deal with the business use cases rather than technology expertise on product specifics. An embodiment of the present invention may be used in conjunction with various IAM solutions ranging from small (e.g., simple LDAP, JSESSIONID based) to large scale IAM deployments.

In an embodiment, a mapping repository stores a mapping between applications and identity providers. For example, a particular application may be configured, using a user interface associated with an identity management system, to allow authentication via one or more identity providers such as Facebook or Yahoo!. The mapping stores an identifier associated with the application, and one or more identity provider identifiers in an embodiment. In an embodiment, a mapping configuration stores the mapping between applications and user repository as well for user attributes similar to the one between Identity Providers and Application that is already mentioned. The user repository may be used by the applications to create user accounts in the local environment. With the combinations of Internet Identity Providers to Applications to User Repository mapping, this gives great flexibility to accommodate many requirements. As part of the user profile attributes received from an Identity Provider and mapping that to the application attributes and then to the user repository attributes, there are mechanisms (configuration) that define which attributes received from an Identity Provider are modifiable and which ones are not. This gives the administrators the capability to say which attributes from an Identity Provider should be used "as is" by the user in the local application environment. This mechanism may also enforce what additional attributes are mandatory during local account creation for the application in an embodiment.

In an embodiment, identity management logic uses the mapping to determine that one or more identity providers are configured as trusted identity providers via the mapping, and can therefore be used to perform authentication activities on behalf of a particular application. In an embodiment, this determination is made in response to the identity management system receiving a request from the application. In an embodiment, an agent associated with the application may also issue a request associated with the application. As used herein and for purposes of claim construction, an agent is an application. Therefore, requests from an agent associated with an application are considered to be requests from an application. This is because the application may implement agent functionality and an agent may implement application functionality. The application may receive a request from a user with a request to authenticate. In response to receiving this request, the application may request, from the identity management system, information identifying one or more identity providers that may be used to authenticate the user with the particular application.

In an embodiment, credential management logic generates credential collection data for use with a credential collection interface. For example, in response to the request from the application for identity provider identifying information, credential management collection logic may generate a web page, XML, I-frame, or other data structure or interface that identifies the identity providers that can be used to authenticate the user for that application. This credential collection data may include user interface elements in an embodiment. For example, an I-frame may be generated, including HTML code used to generate form fields for collecting a username and password from the user, along with a set of radio buttons that may be presented to the user to allow the user to select a particular identity provider to use to log on to the application. In an embodiment, presentation logic is configured to generate the user interface elements used to collect the credential information from users.

In an embodiment, identity management logic can determine whether two separate applications can both use the same identity provider. When this is the case, a user may be able to sign on to a first application by providing login credentials to a particular identity provider, and then sign on to a second application without providing login credentials. For example, a user's browser may receive a token, such as a cookie, in response to successfully authenticating using the particular identity provider. When the user's browser makes a request to the second application, the second application will pass the token to the identity management system and determine that the token is sufficient to authorize the user to access the second application without the need to provide login credentials again.

In an embodiment, a first application may use a token that is generated in response to a successful login via an identity management system to perform actions associated with a second application. For example, a user may log on to a first application, and that first application may be configured to request information from a second application. The first application uses an authentication token provided by the identity management system to request information from the second application. In an embodiment, trust relationships between applications may be configured via a user interface, so that applications that have a trust relationship may perform certain actions and access certain data from other applications on behalf of a user, so long as that user has logged in to a trusted application.

In an embodiment, the identity management logic is configured to determine that a user of a first application has been authenticated using an identity provider. In response to a request from the first application to perform an action associated with a second application, it may be determined that the first application is a trusted application with respect to the second application based at least in part on the determination that the user of the first application has been authenticated using the identity provider. Identity management logic may then generate a token that enables the first application to perform the action on the second application.

Identity data may be retrieved from an identity provider in response to receiving authentication credential information for the identity provider in an embodiment. Identity data may include user identifying information, such as the user's name, address, date of birth, relationship information, social graph data, or any other information that may be linked to the user. In an embodiment, an identity collection interface may be generated in order to collect more data about the user for local account creation. The interface may be pre-populated with the data retrieved from the identity provider. For example, the user may log in to an application using login credentials for the user's Facebook identity. However, the user may benefit from storing additional user-identifying information at the local identity management system because having a local account may allow the user additional access or the ability to take advantage of additional features that may not be available for users that only use Facebook credentials to login to the application. The user is presented with an opportunity to create a local account or identity, and the identity information that was gathered from the other identity provider (i.e., Facebook) can be used to fill out a portion of the form for the user to make the process easier.

These features ensure that users have maximum flexibility when choosing to log in to an application. In addition, businesses and application providers can leverage the existing treasure trove of identity information that is already stored on other networks to allow users to login to their applications to try them out, and later create "full" accounts on the local identity management system.

Structural and Functional Overview

Referring to FIG. 1, an embodiment of an identity management system 100 known as a relying party system is shown. Identity management system 100 manages identity-related services for a variety of properties and applications. Identity management system 100 may be part of or associated with an authorization and access management system in an embodiment. The following interfaces are exposed in an embodiment of identity management system 100:

Identity Provider Selector Interface 110:

This contract is relevant if the site wants to integrate with the relying party system to handle the presentation of available identity provider choices. Invoking this interface will lead relying party system to direct the user to go the "extended", Internet Login experience. The relying party system will expose the configuration interfaces for URLs for each of the identity providers supported. Identity provider selector interface contract provides list of known identity providers to the web site. This contract enables websites to build an extension for the existing login screen/web page to show all the external authentication systems such as Internet identity providers (Google, Yahoo etc.), trusted partner authentication systems (with SAML) and other systems.

Post Identity Provider Selection Interface 120:

This contract allows redirection to Internet Identity Services (Relying Party for Cloud) endpoints to initiate the identity provider flow based on the selection made. This includes all parameters needed by the relying party system to initiate the flow. The post identity provider selector Interface allows the website to exchange the selected identity provider, protocol and any other protocol/user attributes that are needed for an RP to interact with external identity system.

Identity Provider Interaction Interface 130:

Providers of this interface include implementations for vanilla OpenID, specific OpenID implementations, other protocols. This contract is primarily to enable system integrators, customers and future development to cleanly add new providers without major changes to the core framework. This contract provides two sub-contracts: SSO/Authn with IDP and Attribute fetch from identity provider. The identity provider Interaction Provider Interface is purely between a relying party to the external authentication system and this contract executes the corresponding protocol depending on type of the identity provider.

Registration Status Check Provider Interface 140:

The main contract is a SPI and subcontract is a RESTful call. The configured provider is invoked upon successful completion of the identity provider flow. A default implementation of the SPI invokes the REST call to query if the user just authenticated (via the selected identity provider) already exists. Another implementation of the SPI could make a direct call to a configured LDAP user repository. The Registration Status Check Interface enables RP to find the local user presence based on the authentication assertion/attributes obtained from the Identity Provider. While this is optional from the requirement perspective, this contract enables the website/application to provide a self-registration option.

Registration Task Flow Provider Interface 150:

The main contract is a SPI. The configured provider is invoked when interface 140 indicates user does not exist. A default implementation of the SPI makes the appropriate attribute query call to the identity provider to retrieve additional attributes for the user and uses "redirect" to a preconfigured registration URL with the user profile attributes. Optionally it may pass a return URL to indicate to the registration flow which page to finally redirect to once user has registered. The Registration Task Flow Provider Contract enables the RP to initiate the registration task flow based on interface 140. This contract is to create a user in the local system with appropriate attributes.

Session Creation Provider Interface 160:

The main contract is a SPI. The configured provider is invoked when interface 140 indicates user already exists. A default implementation of the SPI uses "redirect" to a preconfigured authentication URL with the identity of the user. Optionally it may pass a return URL to indicate to the authentication flow which page to finally redirect to once user session is created. These contract invocations are identified in the Flow Details interaction diagram in the next section. Below is a summary of the contracts in pictorial form. The Session Creation Provider Interface is to establish a user session for the web site access. The user session is created by relying on the authentication assertion from the trusted external authentication provider.

Configuration Provider Interface (not Shown):

This interface allows RP to leverage an existing configuration store for its own configuration data. The intent here is to provide seamless configuration/administration with the environment in which RP is deployed.

User Attribute Mapper/Authorization Provider Interface (not Shown):

This interface is used by relying party to store per "application" or more accurately, the consumers of relying party user attribute mapping data, as well as the attributes the relying party is authorized to retrieve from the identity provider.

Figure 2:
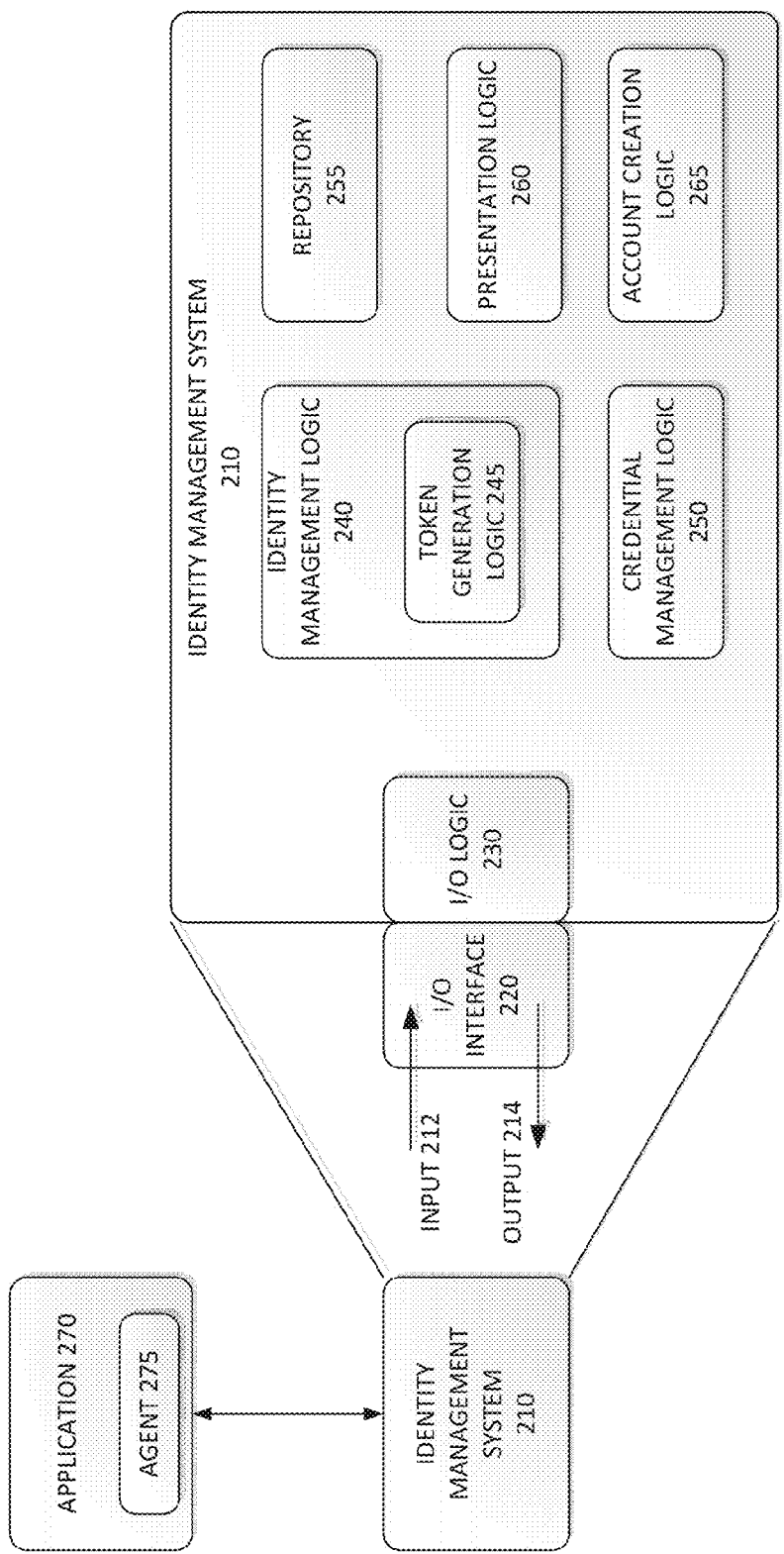
FIG. 2 illustrates a simplified block diagram of an identity management system in an embodiment.

FIG. 2 illustrates a simplified block diagram of an identity management system 210 in an embodiment. Application 270 includes agent 275 in the embodiment shown in FIG. 2. However, application 270 may not include agent 275 in an embodiment. Agent 275 may be configured to intercept certain types of requests from a user's browser or other client, and to communicate with identity management system 210 in an embodiment. In an embodiment, application 270 interacts directly with identity management system 210.

In the embodiment shown in FIG. 2, identity management system 210 is a collection of entities 240, 245, 250, 255, 260, 265, each of which may be implemented in logic such as software logic, hardware logic, or any combination thereof. Identity management system 210 includes an input/output (I/O) interface 220 in an embodiment. In another embodiment, I/O interface 220 is not part of identity management system 210, but is coupled to identity management system 210. I/O interface 220 may be configured to couple identity management system 210 to a network or a user input device such as a keyboard, mouse, or any other user input device. I/O interface 220 may also be configured to identity management system 210 to other devices or means of providing or interpreting signals or data such as an input 212, including a network, display device, or transmission media device capable of transmitting or displaying an output 214. In an embodiment, I/O interface 220 may represent multiple I/O interfaces.

Input 212 may include input from a web application such as application 270 or an agent such as agent 275 in an embodiment. Agent 275 may be configured to intercept access requests from a user such as an access request issued from a user's web browser software or other software or hardware. These requests may be directed in whole or in part to identity management system 210 in the form of input 212.

In an embodiment, access management system 210 includes an I/O logic 230 configured to receive input 212 from I/O interface 220. I/O logic 230 may be configured to store input 212 or information associated with input 212 in non-transitory media, such as volatile or non-volatile storage media. For example, I/O logic 223 may include logging logic. I/O logic 230 is communicatively coupled to identity management logic 240, credential management logic 250, repository 255, presentation logic 260, and account creation logic 265 in an embodiment.

In an embodiment, repository 255 represents storage such as a hard drive, memory, shared storage system, which may be implemented in connection with a database or other data access solution such as an LDAP directory. In an embodiment, any storage mechanism may be used to perform the functions of the repository. Repository 255 may be part of identity management system 210, or may be external to identity management system 210 so that it is accessible by a network connection, serial connection, or other communication means. Repository 255 stores a mapping between applications and identity providers. For example, a first application may be associated with a first identity provider such as Facebook and a second identity provider such at Linkedin. This association means that the application is configured such that a user may log in to the application using either of these mapped identity providers. The mapping may also include a second application that is only associated with one identity provider, or only a local account.

The information stored in repository 255 is not static. A user interface is provided in an embodiment to allow an administrator or other person to configure the identity management system 210. For example, an administrator may wish to add support for a new identity provider. In an embodiment, an administrator may use a user interface to provide the necessary instructions for integrating with a new identity provider. In a similar fashion, an administrator may add support for a new application by providing the necessary instructions for integrating with the application.

An administrator may also wish to change the mapping(s) associated with an application. For example, an administrator may determine that a user should be able to log on to a particular application using an identity provider that is not currently associated with the application. The administrator may log on to the identity management system 210 user interface and create a mapping between the application and the desired identity provider. In an embodiment, the user interface includes standard HTML forms that allow the administrator to select from a list of available applications, and select from a list of available identity providers. The administrator then submits the combination, causing a mapping to be stored in repository 255. Any user interface elements may be used in an embodiment.

Repository 255 may also include additional metadata or configuration data associated with identity providers and applications. For example, repository 255 may include metadata that describes policies that determine which portions of or what data associated with an application may be accessed by a user, depending on which identity provider is used. To further this example, a user that uses Facebook to authenticate with a photo sharing application may be allowed to view photos with a low privacy setting, while users that authenticate with a local account or via Linkedin may be able to view photos with a higher privacy setting, and also upload photos.

In an embodiment, identity management logic 240 is configured to access repository 255. Identity management logic uses the mapping stored in repository 255 to determine which identity providers may be used to perform authentication activities on behalf of which applications. For example, when a user's browser requests access to an application such as a web-based application, the application or an agent within or associated with the application directs the request to identity management system 210 after determining that the user's browser does not have a token (such as a cookie) indicating that the browser is already associated with a session. Identity management logic 240 accesses the mapping(s) associated with the application in repository 255 to determine which identity providers may be used to perform authentication functionality on behalf of the application. For example, identity management logic 240 may determine based on the mapping that an application may accept/trust authentication via Facebook or OpenID.

In an embodiment, token generation logic 245 is included in identity management logic 240. Token generation logic 245 generates tokens that may be used to verify that a user's browser or an application has established a session with the identity management system. In an embodiment token and session information are stored in repository 255. When a browser or application requests access to a resource such as a second application, the application or an agent may receive a token. The token may be passed to identity management system 210, where identity management logic 240 compares the token with the token and session information in repository 255 to verify that they token is valid. If the token is valid, then identity management system 210 sends a message to the application to indicate that that the token is valid, and that authentication should be granted based on the token.

Credential management logic 250 receives and verifies login credentials in an embodiment. In an embodiment, credential management logic 250 is included in identity management logic 240. Credential management logic 250 is also configured to generate credential collection data for use with a credential collection interface after determining that a group of particular identity providers can be used to perform authentication activities on behalf of an application. Credential collection data identifies at least one of the one or more first identity providers. And may be used to generate an authentication interface in an embodiment.

For example, when a browser requests access to a web application, the web application may send a message to identity management system 210 to determine how to authenticate the browser. After the mapping is checked to see which providers may be used for authentication, the mapping information is used by credential management logic 250 to generate credential collection data. The credential collection data may include the name of each identity providers and the relevant user interface elements and metadata to allow the user to select from the group of providers. In an embodiment, credential collection data may be used to generate an I-frame that has logos associated with each identity provider, and may have form fields and buttons to allow the user to provide information such as login credentials. In an embodiment, a form is provided to the user after a provider has been selected by the user. In an embodiment, presentation logic 260 generates the user interface elements.

Account creation logic 265 is configured to perform aspects of creating a new account in an embodiment. One benefit from supporting both local accounts and accounts associated with identity providers is that a potential user may log on to an application without signing up for a local account. After trying out the application, the user may be required to set up a local account, but some of the information required to create a local account may be pre-populated using information gathered from an identity provider. For example, a user may wish to try out a web application such as a photo sharing or accounting application. After a 15 day trial, the user may be required to sign in with a local account to continue use, where the local account requires more specific information about the user than the identity provider provides to identity management system 210. Presentation logic 260 may generate an account creation form based on information received from account creation logic 265. For example, account creation logic 265 may determine that several of the data items required for account creation may be pre-populated in the form based on an earlier login by the user using an identity provider. In an embodiment, based on this information, presentation logic 260 generates a form for the user to fill out, but automatically fills out portions of the form where possible, such as name and email address information.

Figure 3:
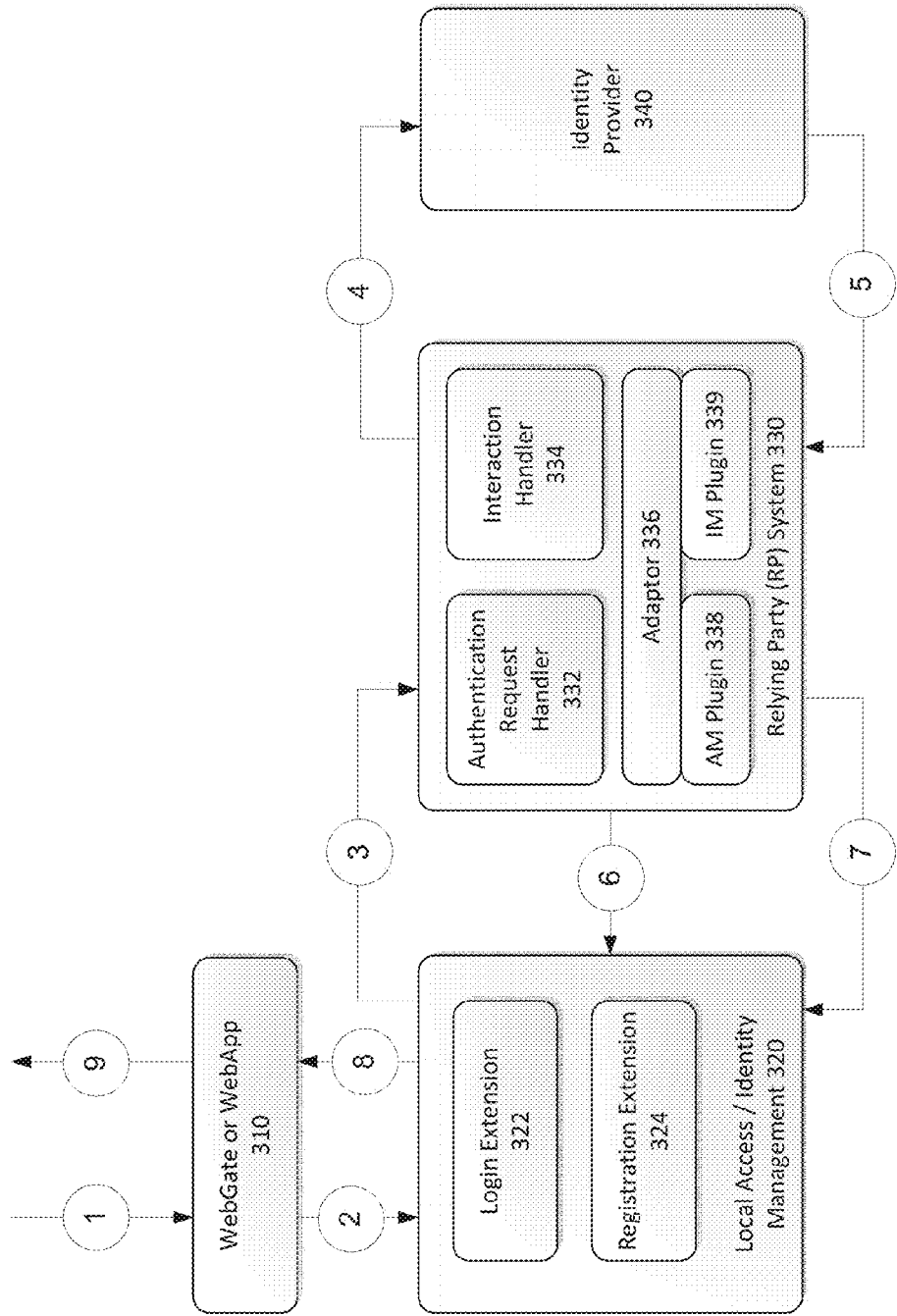
FIG. 3 illustrates an example architecture on which an embodiment may be implemented.

FIG. 3 illustrates an example architecture on which an embodiment may be implemented. The embodiment shown in FIG. 3 is described in terms of logical groupings based on functionality. In this architecture, the primary components are: the local access management infrastructure and identity management infrastructure 320, the relying party system 330 and an external identity provider 340 that provides authentication services. The access management infrastructure provides a centralized authentication and single sign-on capabilities for various applications that are protected by the respective agents (also known as WebGates). Local access management infrastructure and identity management infrastructure 320 includes a login extension 332 that assists with login functionality and registration extension 324 that assists with registration functionality, both as described above. Relying party system 330 includes authentication request handler 332 and interaction handler 334. Authentication request handler 332 receives and handles authentication requests redirected from local access and identity management 320. Interaction handler 334 handles interactions between the relying party system 330 and the identity provider(s) 340. An adapter 336 is also included in relying party system 330 in an embodiment. The adapter facilitates the addition of plug-ins, which extend the functionality of the relying party system 330 via access management plugin 330 and identity management plugin 339 in an embodiment. The identity store for the access management infrastructure is provisioned through the identity management infrastructure with a database or an LDAP Server in an embodiment. In the FIG. 3, the WebGate 310 intercepts the user request for an application resource and redirects to the access management system 320 for authentication as per the configured authentication policy.

Referring to FIG. 3, at step 1a user attempts to access a protected web application. At step 2, the application or a WebGate/agent redirects the request to access management infrastructure for authentication. At step 3, access manager redirects the request to relying party infrastructure using interface 120. At step 4, interface 130 is used to execute user authentication using the identity provider of choice. At step 5, user authentication assertion is sent to relying party system. At step 6, relying party system checks to see if the user has a local account using interface 140. If so, the permissions granted to the local account may be inherited by the session based on the identity provider login and a link between the accounts that is stored in repository 255. At step 7, interface 150 or 160 is used to authenticate the user or create an account, depending on the outcome of step 6. At step 8, the target URL is returned. At step 9, the target URL is allowed or denied, depending on the outcome of steps 1-8.

Example Flows

Users have a choice between local authentication and authentication facilitated by an identity provider in an embodiment. If a user selects one of the available identity providers, a "single sign-on" (SSO) flow is started in the background. The user is then redirected to the identity provider for authentication. Upon successfully logging in to the identity provider, the user is asked to consent to sharing the identity information with the relying party system. In other words, the relying party system must be authorized by the user to retrieve information from the identity provider for privacy and security reasons. The relying party framework then verifies the authentication and stores relevant attributes from the shared identity information. These attributes may then be shared with the local "interested" systems such as a policy management system, authorization system, access management system, and the like.

Figure 4:
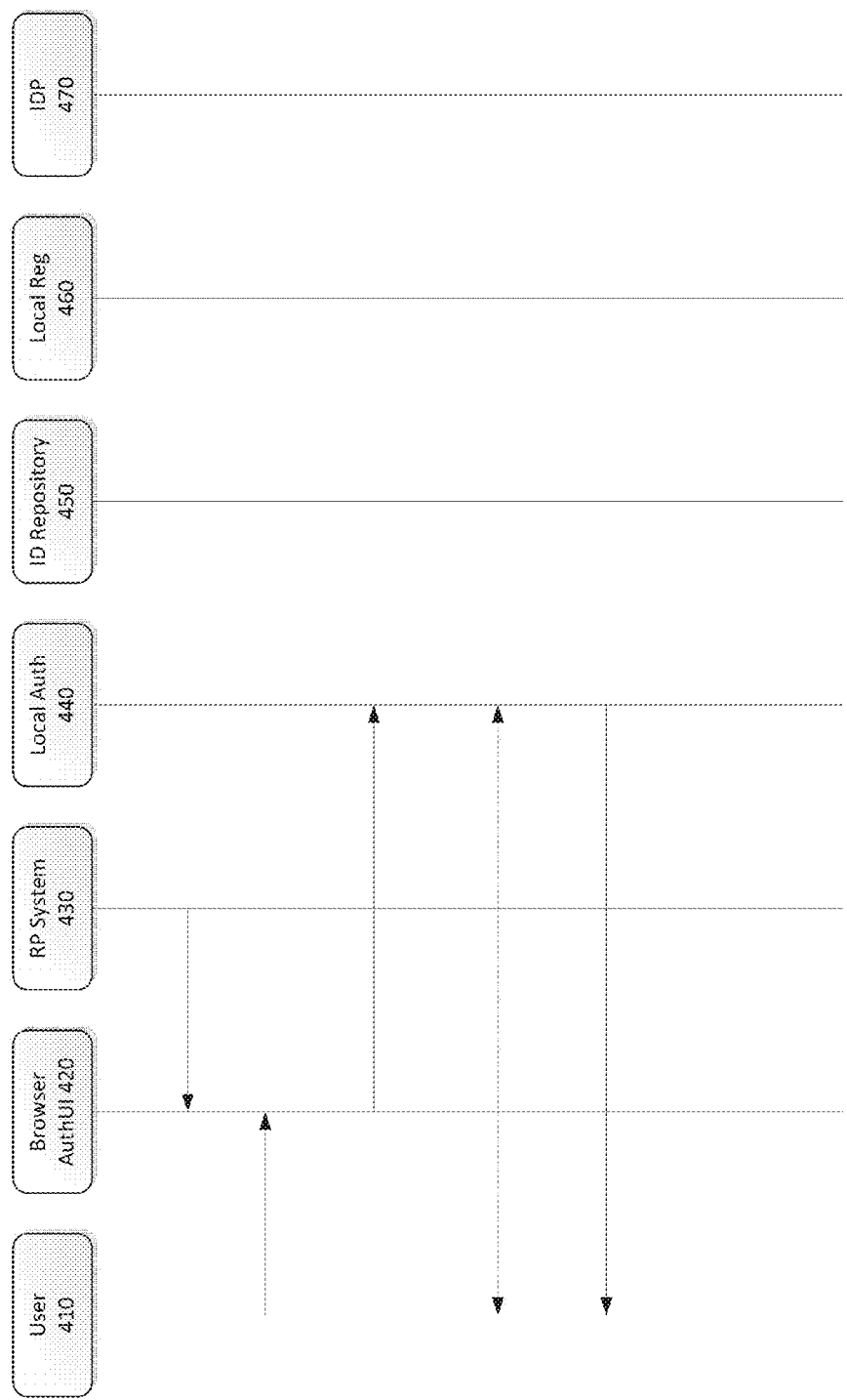
FIG. 4 illustrates an example flow in an embodiment depicting the interaction between the entities described in FIG. 3 where the user chooses to use local authentication.

FIG. 4 illustrates an example flow in an embodiment depicting the interaction between the entities described in FIG. 3 where the user chooses to use local authentication. The relying party system 430 provides a browser authentication user interface using interface 110. In this case, the user chooses to log in to the local system, rather than through an identity provider. The browser is redirected to the local authorization system 440, and a session is created between the user 410 and the local authorization system. Identity repository 450, local registration 460, and identity provider 470 are not used in this flow.

Figure 5:
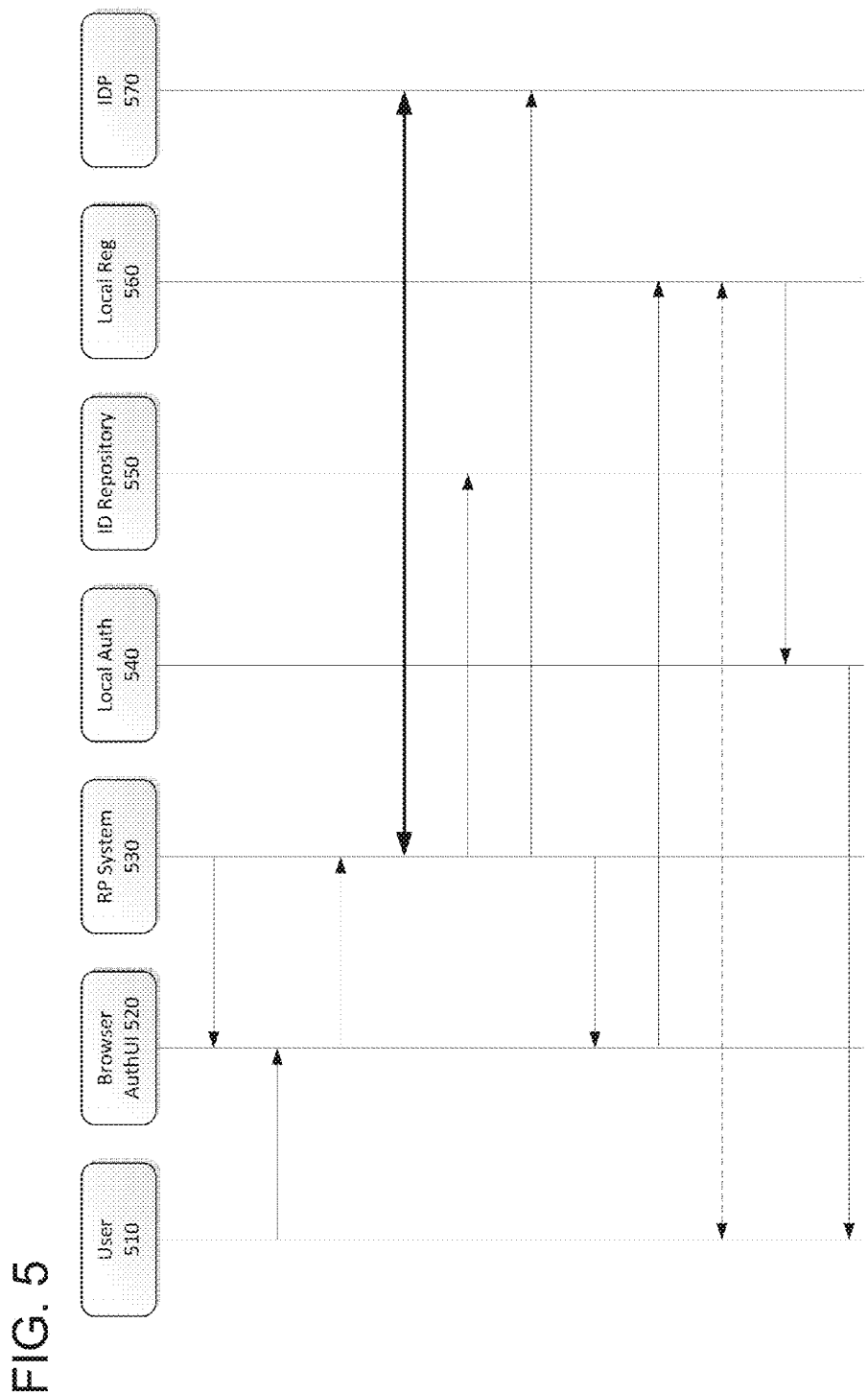
FIG. 5 illustrates an example flow in an embodiment depicting the interaction between the entities described in FIG. 3 where the user chooses to use an identity provider, and then sign up for a local account as a new user.

FIG. 5 illustrates an example flow in an embodiment depicting the interaction between the entities described in FIG. 3 where the user chooses to use an identity provider, and then sign up for a local account as a new user. The relying party system 530 provides a browser authentication user interface using interface 110. In this case, the user chooses to log in to the through an identity provider 570 instead of the local system. The browser is redirected to the relying party system 530. The relying party system 530 opens a session with the identity provider 570 using interface 130, and authenticates the user. Then the identity repository 550 is queried to see if the user is a new or existing user. In this case, the user is a new user, so the relying party system 530 retrieves user attributes from the identity provider 570 and then initiates a new user registration flow. The browser authorization user interface then uses interface 150 to create an account using the local registration system 560, after which the registration is completed and a new session is generated.

Figure 6:
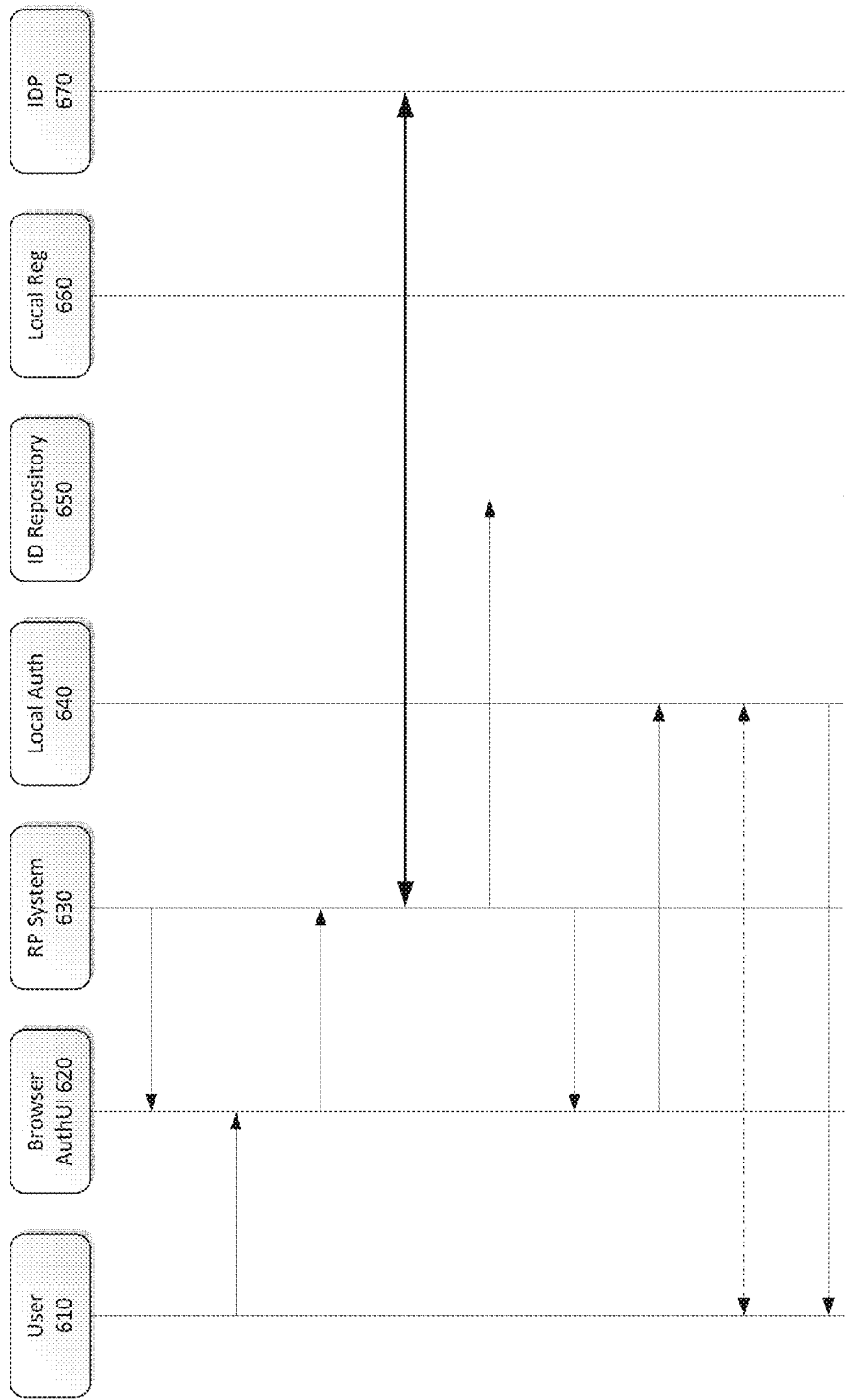
FIG. 6 illustrates an example flow in an embodiment depicting the interaction between the entities described in FIG. 3 where the user chooses to use an identity provider, but already has a local account.

FIG. 6 illustrates an example flow in an embodiment depicting the interaction between the entities described in FIG. 3 where the user chooses to use an identity provider, but already has a local account. The relying party system 630 provides a browser authentication user interface using interface 110. In this case, the user chooses to log in to the through an identity provider 670 instead of the local system. The browser is redirected to the relying party system 630. The relying party system 630 opens a session with the identity provider 670 using interface 130, and authenticates the user. Then the identity repository 650 is queried to see if the user is a new or existing user. In this case, the user is an existing user, so an existing user authentication flow is initiated at the browser authentication user interface using interface 110.

The browser authentication user interface 620 authenticates with the local authorization system 640 and a new session is created.

Sample User Interface

FIG. 7 represents an example user interface that includes a login screen for credential collection. Once the user clicks on selected authentication provider, the browser will be redirected to the relying party system 330 using interface 120 to initiate the corresponding protocol. The user is presented with an identity provider login page as appropriate based on the chosen identity provider. Once the user authenticates and authorizes, the corresponding authentication assertion is sent back to the relying party system 330.

The request context is maintained for the entire transaction so that the relying party system and/or access management system can redirect back to the protected application as appropriate. The relying party system 330 when it successfully completes a single sign-on process between identity provider 340 and relying party system 330, the interaction handler 334 invokes Registration Check Interface contract to check the user presence. This model allows this contract to be independent of relying party system 330 design and will depend on the run time artifacts of the contract.

If the user presence check returns true, the relying party system 330 also checks for progressive registration. Progressive registration is where the user attributes obtained from the Identity Provider provide more details of the user identity than the existing attributes. In this case, user is redirected for re-registration with new set of attributes.

Session Creation Provider Interface: When the user is present, the relying party system 330 Adapter redirects to the 'Return URL' by securely transferring the user attributes and authentication status as per the contract defined by TAP mechanism. The 'Return URL' would TAP authentication scheme endpoint. The TAP authorization scheme at access management server 320 validates the response from relying party system 330 and creates a user session. In an embodiment, a trust mechanism between Relying Party Framework or Session Creation Provider must be established to securely exchange data. Trusted Authentication Protocol (TAP) or other secure mechanisms can be used in these embodiments.

Registration Task Flow Interface: When the user does not present, the adapter 336 redirects to 'Registration URL' (provided through configuration) with corresponding user attributes. The registration extension at access management server 320 Server pre-populates the registration page with the user attribute value pairs obtained from OP and present it to the user. This is similar to self-registration on access management server 320 Server except the user attribute values are pre-populated.

Hardware Overview

Figure 8:
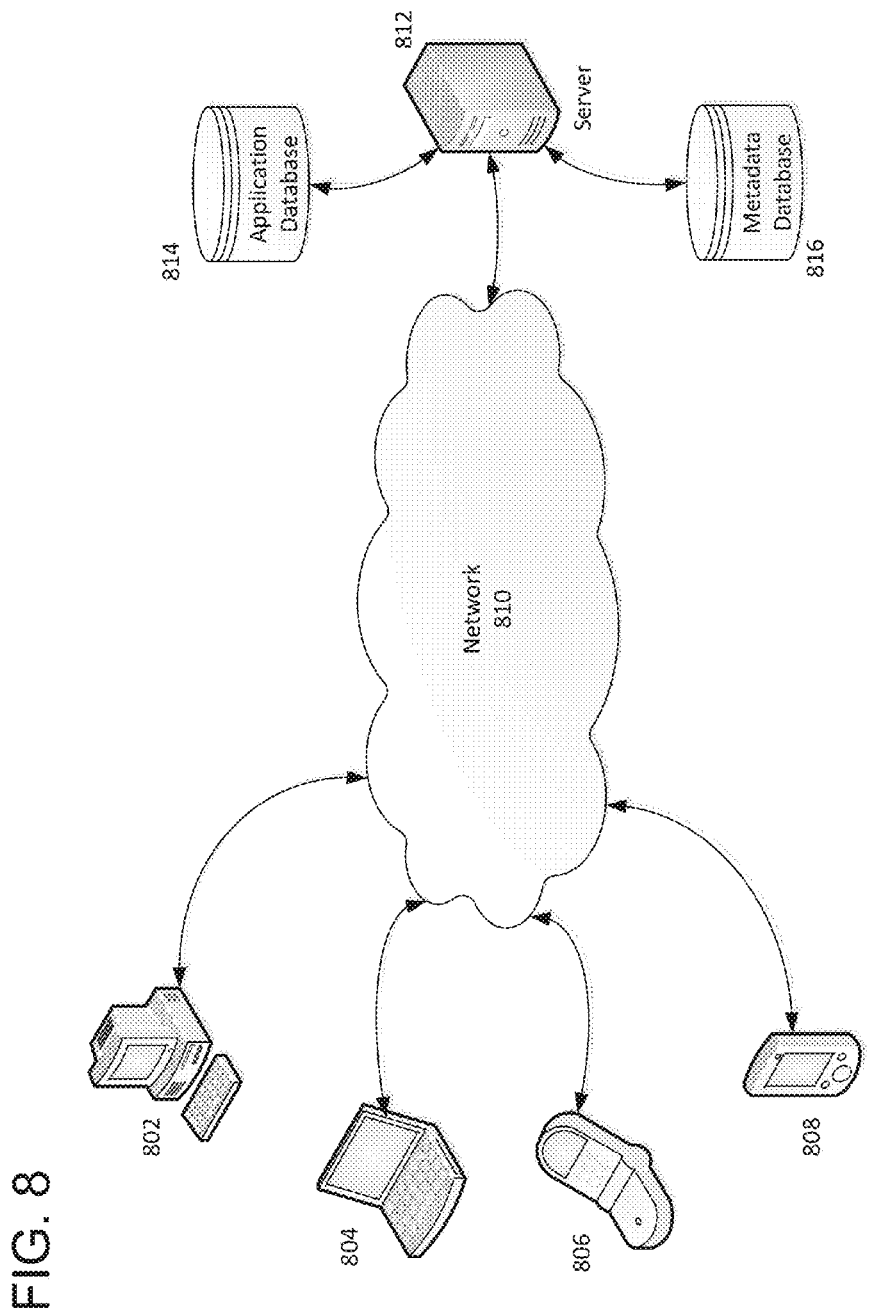
FIG. 8 is a simplified block diagram illustrating components of a system environment that may be used in accordance with an embodiment of the present invention.
Figure 9:
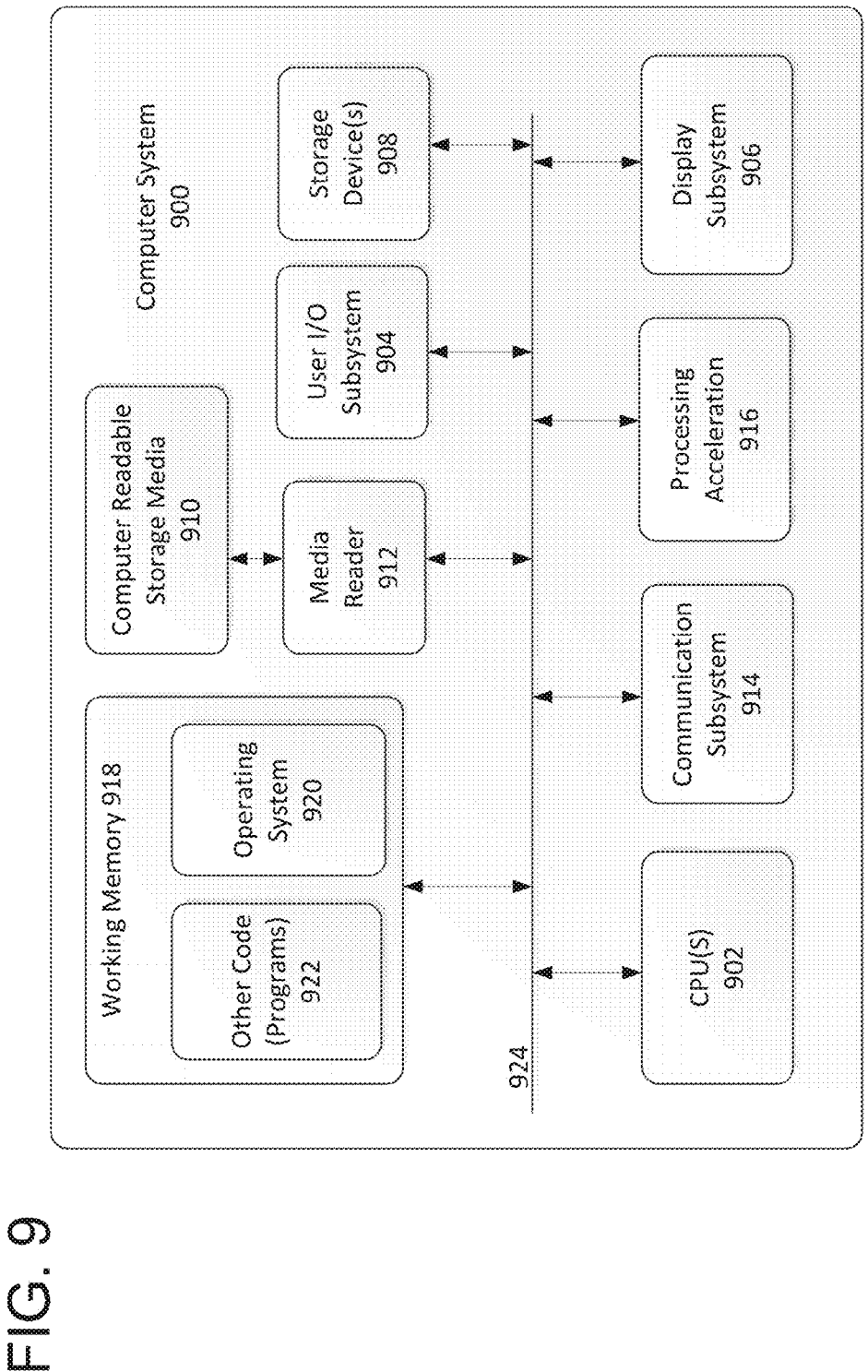
FIG. 9 is a simplified block diagram of a computer system that may be used in accordance with embodiments of the present invention.

FIG. 8 is a simplified block diagram illustrating components of a system environment 800 that may be used in accordance with an embodiment of the present invention. As shown, system environment 800 includes one or more client computing devices 802, 804, 806, 808, which are configured to operate a client application such as a web browser, proprietary client (e.g., Oracle Forms), or the like. In various embodiments, client computing devices 802, 804, 806, and 808 may interact with a server 812.

Client computing devices 802, 804, 806, 808 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 802, 804, 806, and 808 may be any other electronic device, such as a thin-client computer, Internet-enabled gaming system, and/or personal messaging device, capable of communicating over a network (e.g., network 810 described below). Although exemplary system environment 800 is shown with four client computing devices, any number of client computing devices may be supported. Other devices such as devices with sensors, etc. may interact with server 812.

System environment 800 may include a network 810. Network 810 may be any type of network familiar to those skilled in the art that can support data communications using any of a variety of commercially-available protocols, including without limitation TCP/IP, SNA, IPX, AppleTalk, and the like. Merely by way of example, network 810 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 800 also includes one or more server computers 812 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 812 may be adapted to run one or more services or software applications described in the foregoing disclosure. For example, server 812 may correspond to a server for performing relying party and open authorization processing according to an embodiment of the present invention.

Server 812 may run an operating system including any of those discussed above, as well as any commercially available server operating system. Server 812 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 800 may also include one or more databases 814, 816. Databases 814, 816 may reside in a variety of locations. By way of example, one or more of databases 814, 816 may reside on a non-transitory storage medium local to (and/or resident in) server 812. Alternatively, databases 814, 816 may be remote from server 812, and in communication with server 812 via a network-based or dedicated connection. In one set of embodiments, databases 814, 816 may reside in a storage-area network (SAN) familiar to those skilled in the art. Similarly, any necessary files for performing the functions attributed to server 812 may be stored locally on server 812 and/or remotely, as appropriate. In one set of embodiments, databases 814, 816 may include relational databases, such as databases provided by Oracle, that are adapted to store, update, and retrieve data in response to SQL-formatted commands.

FIG. 2 is a simplified block diagram of a computer system 200 that may be used in accordance with embodiments of the present invention. For example server 802 may be implemented using a system such as system 200. Computer system 200 is shown comprising hardware elements that may be electrically coupled via a bus 224. The hardware elements may include one or more central processing units (CPUs) 202, one or more input devices 204 (e.g., a mouse, a keyboard, etc.), and one or more output devices 206 (e.g., a display device, a printer, etc.). Computer system 200 may also include one or more storage devices 208. By way of example, the storage device(s) 208 may include devices such as disk drives, optical storage devices, and solid-state storage devices such as a random access memory (RAM) and/or a read-only memory (ROM), which can be programmable, flash-updateable and/or the like.

Computer system 900 may additionally include a computer-readable storage media reader 912, a communications subsystem 914 (e.g., a modem, a network card (wireless or wired), an infra-red communication device, etc.), and working memory 918, which may include RAM and ROM devices as described above. In some embodiments, computer system 900 may also include a processing acceleration unit 916, which can include a digital signal processor (DSP), a special-purpose processor, and/or the like.

Computer-readable storage media reader 912 can further be connected to a computer-readable storage medium 910, together (and, optionally, in combination with storage device (s) 908) comprehensively representing remote, local, fixed, and/or removable storage devices plus storage media for temporarily and/or more permanently containing computer-readable information. Communications system 914 may permit data to be exchanged with network 1610 and/or any other computer described above with respect to system environment 1600.

Computer system 900 may also comprise software elements, shown as being currently located within working memory 918, including an operating system 920 and/or other code 922, such as an application program (which may be a client application, Web browser, mid-tier application, RDBMS, etc.). In an exemplary embodiment, working memory 918 may include executable code and associated data structures used for relying party and open authorization-related processing as described above. It should be appreciated that alternative embodiments of computer system 900 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile (non-transitory), removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope.

What is claimed is:
1. A system, comprising:
   a processor;
   a non-transitory computer-readable storage medium;
   a mapping repository configured to store a mapping between applications and identity providers, wherein the mapping associates each application of a plurality of applications with one or more identity providers;
   identity management logic configured to use the mapping to determine that one or more first identity providers of a first plurality of identity providers can be used to perform authentication activities on behalf of a first application in response to receiving a first request associated with the first application;
   said non-transitory computer-readable storage medium storing instructions that cause said processor to:
      receive the first request specifying the first application;
      invoke a first identity provider of a plurality of identity providers to authenticate an entity associated with the first request based on a first mapping between the first application and the first identity provider;
   wherein the identity management logic is further configured to:
      determine that a first user of the first application has been authenticated using the first identity provider of the one or more first identity providers;
      determine, in response to a request from the first application to perform an action associated with a second application, that the first application is a trusted application with respect to the second application based at least in part on the determination that the first user of the first application has been authenticated using the first identity provider;
      generate a token that enables the first application to perform the action on the second application;
      receive a second request specifying a second application different from the first application; and
      invoke a second identity provider of the plurality of identity providers to authenticate an entity associated with the second request based on a second mapping between the second application and the second identity provider; and
   wherein the first identity provider differs from the second identity provider.
2. The system of claim 1, further comprising:

credential management logic configured to generate credential collection data for use with a credential collection interface in response to determining that the one or more first identity providers can be used to perform authentication activities on behalf of the first application, wherein the credential collection data identifies at least one of the one or more first identity providers.

3. The system of claim 2, further comprising:

presentation logic configured to generate a user interface using the credential collection data, wherein the user interface includes one or more authentication user interface elements for collecting authentication credentials.

4. The system of claim 2, wherein the identity management logic is further configured to use the mapping to determine that one or more identity providers of a second plurality of identity providers can be used to perform authentication activities on behalf of the second application in response to receiving the second request associated with the second application.

5. The system of claim 2, wherein:

the identity management logic is further configured to retrieve identity data from the first identity provider in response to receiving authentication credential information associated with the first identity provider, wherein the identity data includes first user identifying information;

the credential management logic is further configured to generate an identity collection interface and pre-populate one or more user input elements of the identity collection interface with at least the first user identifying information;

the system further includes account creation logic configured to generate a local account that includes the first user identifying information in response to receiving a request associated with the identity collection interface;

wherein the first identity provider is an external identity provider.

6. The system of claim 2, wherein:

the second application is a different application than the first application; and at least one of the identity providers in a first set of identity providers is not in a second set of identity providers.

7. A method, comprising:

storing, on a computer-readable storage medium, a mapping between applications and identity providers, wherein the mapping associates each application of a plurality of applications with one or more identity providers;

using the mapping to determine that one or more first identity providers of a first plurality of identity providers can be used to perform authentication activities on behalf of a first application in response to receiving a first request associated with the first application;

receiving the first request specifying the first application;

invoking, by a computer processor, a first identity provider of a plurality of identity providers to authenticate an entity associated with the first request based on a first mapping between the first application and the first identity provider;

determining that a first user of the first application has been authenticated using the first identity provider of the one or more first identity providers;

in response to a request from the first application to perform an action associated with a second application, determining that the first application is a trusted application with respect to the second application based at least in part on the determination that the first user of the first application has been authenticated using the first identity provider;

generating a token that enables the first application to perform the action on the second application;

receiving a second request specifying a second application different from the first application; and invoking, by a computer processor, a second identity provider of the plurality of identity providers to authenticate an entity associated with the second request based on a second mapping between the second application and the second identity provider;

wherein the first identity provider differs from the second identity provider; and wherein the method is performed by one or more computing devices.

8. The method of claim 7, further comprising:

in response to determining that the one or more first identity providers can be used to perform authentication activities on behalf of the first application, generating credential collection data for use with a credential collection interface, wherein the credential collection data identifies at least one of the one or more first identity providers.

9. The method of claim 8, further comprising:

generating a user interface using the credential collection data, wherein the user interface includes one or more authentication user interface elements for collecting authentication credentials.

10. The method of claim 8, further comprising:

in response to receiving the second request, using the mapping to determine that one or more identity providers of a second plurality of identity providers can be used to perform authentication activities on behalf of the second application.

11. The method of claim 8, further comprising:

in response to receiving authentication credential information associated with the first identity provider, retrieving identity data from the first identity provider, wherein the identity data includes first user identifying information;

generating an identity collection interface, wherein one or more user input elements of the identity collection interface are pre-populated with at least the first user identifying information;

in response to receiving a request associated with the identity collection interface, generating a local account that includes the first user identifying information;

wherein the first identity provider is an external identity provider.

12. The method of claim 8, wherein:

the second application is a different application than the first application; and at least one of the identity providers in a first set of identity providers is not in a second set of identity providers.

13. A computer-readable non-transitory storage medium storing a plurality of instructions executable by one or more processors, the plurality of instructions comprising:

storing a mapping between applications and identity providers, wherein the mapping associates each application of a plurality of applications with one or more identity providers;

using the mapping to determine that one or more first identity providers of a first plurality of identity providers can be used to perform authentication activities on behalf of a first application in response to receiving a first request associated with the first application;

receiving the first request specifying the first application;

invoking a first identity provider of a plurality of identity providers to authenticate an entity associated with the first request based on a first mapping between the first application and the first identity provider;

determining that a first user of the first application has been authenticated using the first identity provider of the one or more first identity providers;

in response to a request from the first application to perform an action associated with a second application, determining that the first application is a trusted application with respect to the second application based at least in part on the determination that the first user of the first application has been authenticated using the first identity provider;

generating a token that enables the first application to perform the action on the second application;

receiving a second request specifying a second application different from the first application; and invoking a second identity provider of the plurality of identity providers to authenticate an entity associated with the second request based on a second mapping between the second application and the second identity provider;

wherein the first identity provider differs from the second identity provider.

14. The computer-readable storage medium of claim 13, wherein the plurality of instructions further include instructions that cause the one or more processors to perform:

in response to determining that the one or more first identity providers can be used to perform authentication activities on behalf of the first application, generating credential collection data for use with a credential collection interface, wherein the credential collection data identifies at least one of the one or more first identity providers.

15. The computer-readable storage medium of claim 14, wherein the plurality of instructions further include instructions that cause the one or more processors to perform:

generating a user interface using the credential collection data, wherein the user interface includes one or more authentication user interface elements for collecting authentication credentials.

16. The computer-readable storage medium of claim 14, wherein the plurality of instructions further include instructions that cause the one or more processors to perform:

in response to receiving the second request, using the mapping to determine that one or more identity providers of a second plurality of identity providers can be used to perform authentication activities on behalf of the second application.

17. The computer-readable storage medium of claim 14, wherein the plurality of instructions further include instructions that cause the one or more processors to perform:

in response to receiving authentication credential information associated with the first identity provider, retrieving identity data from the first identity provider, wherein the identity data includes first user identifying information;

generating an identity collection interface, wherein one or more user input elements of the identity collection interface are pre-populated with at least the first user identifying information;

in response to receiving a request associated with the identity collection interface, generating a local account that includes the first user identifying information;

wherein the first identity provider is an external identity provider.

* * * * *

UNITED STATES PATENT AND TRADEMARK OFFICE
CERTIFICATE OF CORRECTION

PATENT NO.        : 9,043,886 B2                                           Page 1 of 1
APPLICATION NO.   : 13/464880
DATED             : May 26, 2015
INVENTOR(S)       : Srinivasan et al.

It is certified that error appears in the above-identified patent and that said Letters Patent is hereby corrected as shown below:

In the specification

Column 5, line 24, delete "100:" and insert -- 100. --, therefor.

Column 7, line 33, after "such" delete "at" and insert -- as --, therefor.

Column 8, line 38, delete "that that" and insert -- that --, therefor.

Column 9, line 57, delete "1a" and insert -- 1 a --, therefor.

In the claims

Column 18, line 1, Claim 15, delete "medium-of" and insert -- medium of --, therefor.

Signed and Sealed this
Ninth Day of February, 2016

Michelle K. Lee
*Director of the United States Patent and Trademark Office*